(12) United States Patent
Shahriar

(10) Patent No.: US 8,504,819 B2
(45) Date of Patent: Aug. 6, 2013

(54) WIRELESS LAN RELAY DEVICE, WIRELESS COMMUNICATION SYSTEM, AND METHOD FOR CONTROLLING WIRELESS LAN RELAY DEVICE

(75) Inventor: Shamsspoor Shahriar, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 168 days.

(21) Appl. No.: 13/069,360

(22) Filed: Mar. 22, 2011

(65) Prior Publication Data

US 2011/0238976 A1    Sep. 29, 2011

(30) Foreign Application Priority Data

Mar. 25, 2010  (JP) .................. 2010-069511

(51) Int. Cl.
*H04L 29/06* (2006.01)

(52) U.S. Cl.
USPC ........... 713/150; 713/153; 713/166; 713/168; 726/4; 726/5; 380/270; 380/283; 370/401

(58) Field of Classification Search
USPC ................. 370/401; 726/4, 5; 713/153, 150, 713/166, 168; 380/270, 283
See application file for complete search history.

(56) References Cited

U.S. PATENT DOCUMENTS

| 7,747,219 B2 * | 6/2010 | Shiohara et al. ............. 455/41.2 |
| 2005/0160287 A1 | 7/2005 | Mehta et al. |
| 2009/0205025 A1 * | 8/2009 | Lin et al. ........................... 726/5 |
| 2010/0211777 A1 * | 8/2010 | Ishihara et al. ............... 713/166 |
| 2010/0235621 A1 * | 9/2010 | Winkler et al. ............... 713/153 |

FOREIGN PATENT DOCUMENTS

| JP | 2001-111544 A | 4/2001 |
| JP | 2002-290418 A | 10/2002 |
| JP | 2002-359623 A | 12/2002 |
| JP | 2009-182847 A | 8/2009 |

* cited by examiner

*Primary Examiner* — Brandon Hoffman
*Assistant Examiner* — Hee Song
(74) *Attorney, Agent, or Firm* — Oblon, Spivak, McClelland, Maier & Neustadt, L.L.P.

(57) ABSTRACT

A wireless LAN relay device connecting an outer device to a network includes a communication section for controlling wired communication and wireless communication performed between the wireless LAN relay device and the outer device using a packet. The communication section performs, in an initial state, wireless communication without encrypting the packet, and encrypts, upon reception of a setting instruction from the outer device, the packet by using a predetermined encryption key and a predetermined encryption method which are preliminarily defined in the wireless LAN relay device.

6 Claims, 18 Drawing Sheets

| ITEM: EIM | IDENTIFIER: EID | ENCRYPTION KEY: EEK | ENCRYPTION MODE: EEM | AUTHENTICATION METHOD: EAT |
|---|---|---|---|---|
| 1 | SSID1 | No Key | No Encryption | No Authentication |
| 2 | SSID2 | No Key | No Encryption | No Authentication |
| 3 | SSID3 | No Key | No Encryption | No Authentication |
| 4 | SSID4 | No Key | No Encryption | No Authentication |

| ITEM : PIM | IDENTIFIER : PID | ENCRYPTION KEY : PEK | ENCRYPTION MODE : PEM | AUTHENTICATION METHOD : PAT |
|---|---|---|---|---|
| 1 | SSID1 | 11111111... | MIX(TKIP/AES) | WPA2 |
| 2 | SSID2 | 22222222... | TKIP | WPA2 |
| 3 | SSID3 | 33333333... | AES | WPA2 |
| 4 | SSID4 | 44444444... | MIX(TKIP/AES) | WPA2 |

FIG.8

| ITEM : EIM | IDENTIFIER : EID | ENCRYPTION KEY : EEK | ENCRYPTION MODE : EEM | AUTHENTICATION METHOD : EAT |
|---|---|---|---|---|
| 1 | SSID1 | 11111111... | MIX(TKIP/AES) | WPA2 |
| 2 | SSID2 | 22222222... | TKIP | WPA2 |
| 3 | SSID3 | 33333333... | AES | WPA2 |
| 4 | SSID4 | 44444444... | MIX(TKIP/AES) | WPA2 |

410

| ITEM : PIM | IDENTIFIER : PID | ENCRYPTION KEY : PEK | ENCRYPTION MODE : PEM | AUTHENTICATION METHOD : PAT |
|---|---|---|---|---|
| 1 | SSID1 | 11111111... | MIX(TKIP/AES) | WPA2 |
| 2 | SSID2 | 22222222... | TKIP | WPA2 |
| 3 | SSID3 | 33333333... | AES | WPA2 |
| 4 | SSID4 | 44444444... | MIX(TKIP/AES) | WPA2 |

| ITEM:EIM | IDENTIFIER:EID | ENCRYPTION KEY:EEK | ENCRYPTION MODE:EEM | AUTHENTICATION METHOD:EAT |
|---|---|---|---|---|
| 1 | SSID1 | 11111111... | MIX(TKIP/AES) | WPA2 |
| 2 | SSID2 | 12345678... | MIX(TKIP/AES) | WPA2 |
| 3 | SSID3 | No Key | No Encryption | No Authentication |
| 4 | SSID4 | 12345678... | AES | WPA2 |

410

| ITEM:PIM | IDENTIFIER:PID | ENCRYPTION KEY:PEK | ENCRYPTION MODE:PEM | AUTHENTICATION METHOD:PAT |
|---|---|---|---|---|
| 1 | SSID1 | 11111111... | MIX(TKIP/AES) | WPA2 |
| 2 | SSID2 | 22222222... | TKIP | WPA2 |
| 3 | SSID3 | 33333333... | AES | WPA2 |
| 4 | SSID4 | 44444444... | MIX(TKIP/AES) | WPA2 |

420

| ITEM:EIM | IDENTIFIER: EID | ENCRYPTION KEY: EEK | ENCRYPTION MODE:EEM | AUTHENTICATION METHOD:EAT |
|---|---|---|---|---|
| 1 | SSID1 | No Key | No Encryption | No Authentication |
| 2 | SSID2 | 12345678... | MIX(TKIP/AES) | WPA2 |
| 3 | SSID3 | No Key | No Encryption | No Authentication |
| 4 | SSID4 | 12345678... | AES | WPA2 |

410

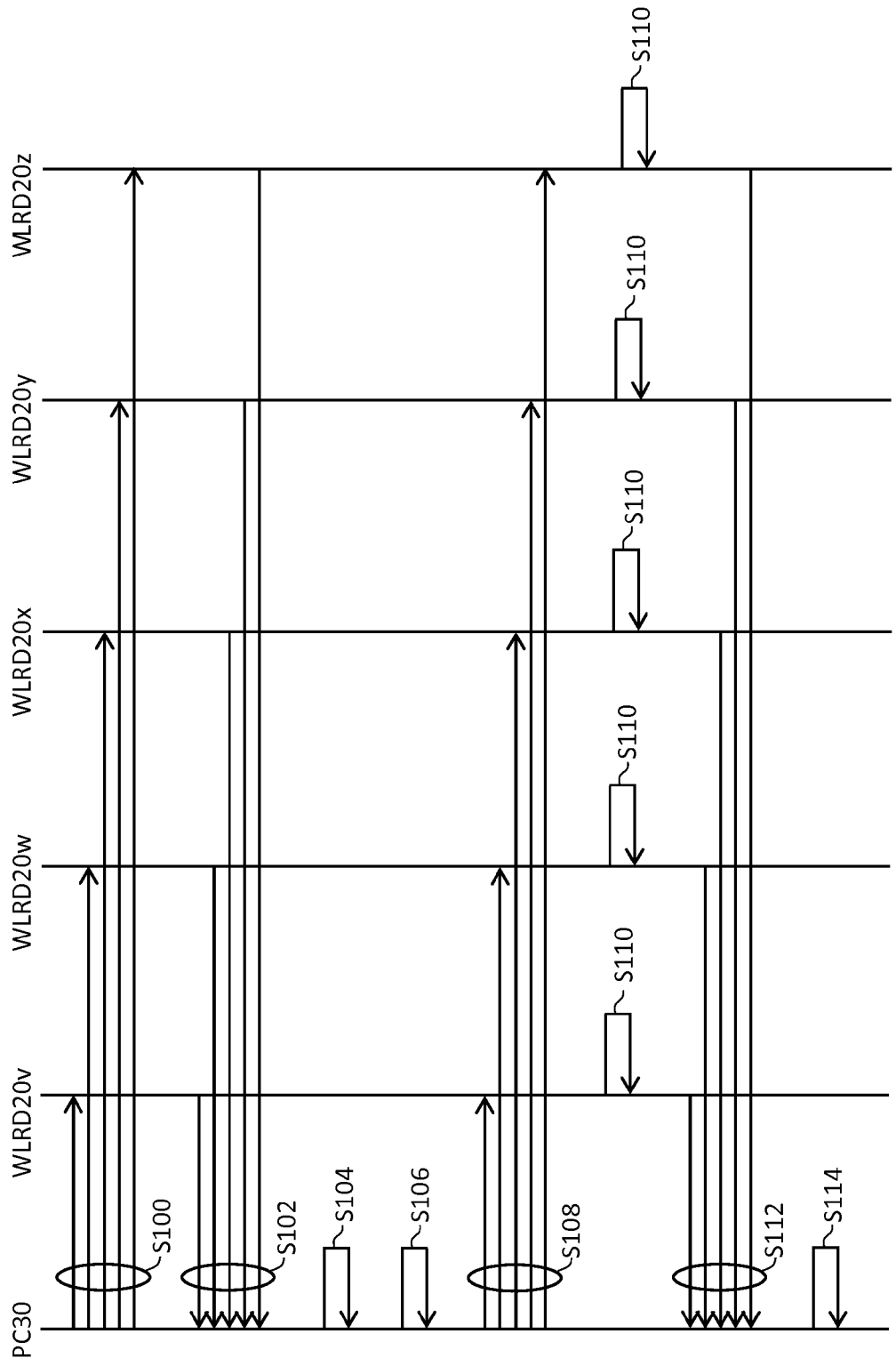

WIRELESS LAN RELAY DEVICE, WIRELESS COMMUNICATION SYSTEM, AND METHOD FOR CONTROLLING WIRELESS LAN RELAY DEVICE

CROSS REFERENCE TO RELATED APPLICATION

The disclosure of Japanese Patent Application No. 2010-069511, filed on Mar. 25, 2010, is incorporated herein by reference.

BACKGROUND OF THE INVENTION

1. Field of the Invention

The present invention relates to a wireless LAN relay device.

2. Description of the Background Art

A wireless Local Area Network (LAN) is becoming popular in recent years. The wireless LAN is a network environment where interactive communication using radio waves is performed between a wireless LAN access point (wireless LAN relay device) and a terminal having a wireless LAN connection device (for example, a personal computer or the like). In such a wireless LAN, anyone can intercept, without using any special tool, details of communication taking place in a range where radio waves are reachable. To take measures against such a risk of interception, a technique of encrypting packets wirelessly transmitted between a wireless LAN relay device and a terminal is disclosed (for example, see Japanese Laid-Open Patent Publication No. 2001-111544).

However, to encrypt a packet, various settings relating to security need to be performed on a wireless LAN relay device, and thus the user needs to have knowledge relating to security.

An object of the present invention is to solve one or more of the above problems, and to provide a technique of enabling simple and easy security settings on wireless LAN relay devices.

SUMMARY OF THE INVENTION

To attain the above object, the present invention has the following features. That is, a first aspect of the present invention is applied to a wireless LAN relay device which connects an outer device to a network. The above object is attained by a wireless LAN relay device comprising: a communication section for controlling wired communication and wireless communication performed between the wireless LAN relay device and the outer device using a packet. The communication section is configured to perform, in an initial state, communication without encrypting the packet, and to encrypt during communication of the packet, upon reception of a setting instruction from the outer device, the packet by using a predetermined encryption key and a predetermined encryption method, which are preliminarily defined in the wireless LAN relay device.

With this configuration, upon reception of a setting instruction from the outer device, the wireless LAN relay device encrypts packets using the encryption key and encryption method which are preliminary defined in the wireless LAN relay device. Thus, the security setting can be performed on the wireless LAN relay device simply and easily.

In a further aspect, the wireless LAN relay device may further comprise: a setting value storage section for storing a current encryption key and a current encryption method for use by the communication section to encrypt the packet; a preset value storage section for storing the predetermined encryption key and the predetermined encryption method; and a control section for transmitting, upon reception of a request from the outer device, the current encryption key and the current encryption method to the outer device, and overwriting, upon reception of the setting instruction from the outer device, the current encryption key and the current encryption method which are stored in the setting value storage section with the predetermined encryption key and the predetermined encryption method which are stored in the preset value storage section.

With this configuration, after receiving the setting instruction from the outer device, the control section of the wireless LAN relay device overwrites the current encryption key and current encryption method which are stored in the setting value storage section and used for encrypting packets, with the predetermined encryption key and predetermined encryption method which are stored in the preset value storage section. Thus, the security setting can be performed on the wireless LAN relay device simply and easily.

In a further aspect, the wireless LAN relay device may further comprise: a setting value storage section for storing a current encryption key and a current encryption method for use by the communication section to encrypt the packet; a preset value storage section for storing the predetermined encryption key and the predetermined encryption method; and a control section for transmitting, upon reception of a request from the outer device, the current encryption key, the current encryption method, the predetermined encryption key, and the predetermined encryption method to the outer device, and overwriting, upon reception of the setting instruction from the outer device, the current encryption key and the current encryption method which are stored in the setting value storage section with an updated encryption key and an updated encryption method which are provided by the outer device.

With this configuration, after receiving the setting instruction from the outer device, the control section of the wireless LAN relay device overwrites the current encryption key and current encryption method which are stored in the setting value storage section and used for encrypting packets, with the updated encryption key and updated encryption method which are updated in the outer device. Thus, the security setting can be performed on the wireless LAN relay device simply and easily.

In a further aspect, the wireless LAN relay device may further comprise: a setting value storage section, a preset value storage section, a status storage section, and a control section. The status setting section a current encryption key and a current encryption method for use by the communication section to encrypt the packet. The present value storage section stores the predetermined encryption key and the predetermined encryption method. The status storage section stores a status indicating whether the packet is encrypted, which is used when the communication section is to perform the wireless communication. The control section transmits, upon reception of a request from the outer device, information including the status stored in the status storage section to the outer device, and overwrites, upon reception of the setting instruction from the outer device, the current encryption key and the current encryption method which are stored in the setting value storage section with the predetermined encryption key and the predetermined encryption method which are stored in the preset value storage section.

With this configuration, after receiving the request from the outer device, the control section of the wireless LAN relay device can transmit information stored in the status storage section instead of transmitting the current encryption key and current encryption method.

In a further aspect, in the wireless LAN relay device, the communication section may be configured to operate in a plurality of logical wireless networks; the setting storage section may store a plurality of the current encryption keys and a plurality of the current encryption methods to be associated with identifiers identifying the plurality of logical wireless networks; the preset value storage section may store a plurality of the predetermined encryption keys and a plurality of the predetermined encryption methods to be associated with the identifiers; and the control section may overwrite, upon reception of the setting instruction by the communication section from the outer device, the current encryption key and the current encryption method which are associated with at least one of the identifiers included in the setting instruction.

With this configuration, after receiving the setting instruction from the outer device, the communication section of the wireless LAN relay device overwrites the current encryption keys and current encryption methods which are associated with the identifiers respectively identifying the logical wireless networks included in the setting instruction. Thus, in the wireless LAN relay device which is capable of structuring a plurality of logical wireless network, the security settings can be performed for the individual logical wireless networks simply and easily.

A second aspect of the present invention is applied to a wireless communication system comprising an outer device and one or more wireless LAN relay devices for connecting the outer device to a network.

The above-described object is attained by the wireless LAN relay devices each comprising: a communication section for controlling wired communication and wireless communication performed between the wireless LAN relay device and the outer device using a packet, for performing, in an initial state, communication without encrypting the packet, and for encrypting during communication of the packet, upon reception of a setting instruction from the outer device, the packet by using a predetermined encryption key and a predetermined encryption method, which are preliminarily defined in the wireless LAN relay device; a setting value storage section for storing a current encryption key and a current encryption method for use by the communication section to encrypt the packet; a preset value storage section for storing the predetermined encryption key and the predetermined encryption method; a status storage section for storing a status indicating whether the packet is encrypted, which is used when the communication section is to perform the wireless communication; and a control section for transmitting, upon reception of a request from the outer device, the current encryption key and the current encryption method to the outer device, and for overwriting, upon reception of a setting instruction from the outer device, the current encryption key and the current encryption method which are stored in the setting value storage section with the predetermined encryption key and the predetermined encryption method which are stored in the preset value storage section, and by the outer device comprising: a request obtaining section for transmitting the request to the wireless LAN relay device, for determining, based on information which is received as a response to the request and stored in the setting value storage section or information including the status stored in the status storage section, whether the communication section encrypts the packet, and for receiving from a user a selection to encrypt the packet if the packet is determined not to be encrypted; and an instruction section for transmitting the setting instruction to the wireless LAN relay device when the request obtaining section receiving the selection to encrypt the packet.

With this configuration, after receiving the user's selection to encrypt packets, the outer device of the wireless communication system transmits to each wireless LAN relay devices the setting instruction. Thus, the security setting can be performed on each wireless LAN relay device simply and easily.

In a further aspect, the communication section may be configured to operate in a plurality of logical wireless networks; the setting storage section may store a plurality of the current encryption keys and a plurality of the current encryption methods to be associated with identifiers identifying the plurality of logical wireless networks; the preset value storage section may store a plurality of the predetermined encryption keys and a plurality of the predetermined encryption methods to be associated with the identifiers. The outer device may comprise: the request obtaining section transmits the request to the wireless LAN relay device, determines, based on the information which is received as the response to the request and stored in the setting value storage section or the information including the status stored in the status storage section, whether the communication section encrypts a plurality of the packets for the plurality of logical wireless networks, and receives from the user a selection to encrypt at least one of the packets that is not encrypted, if any of the packets is determined not to be encrypted; and the instruction section for transmitting to the wireless LAN relay device, when the request obtaining section receives the selection to encrypt the at least one of the packets, the setting instruction including the identifier of the wireless network, for which the packet is selected to be encrypted.

With this configuration, after receiving the user's selection to encrypt packets, the outer device in the wireless communication system transmits to the wireless LAN relay device the setting instruction including identifiers respectively identifying the selected logical wireless networks. Thus, in a wireless LAN relay device which is capable of structuring a plurality of logical wireless networks, the security settings can be performed for the individual logical wireless networks simply and easily.

In a further aspect, the wireless communication system comprises a plurality of wireless LAN relay devices. The request obtaining section may: transmit requests to the plurality of wireless LAN relay devices, determine, based on information which is received from the wireless LAN relay devices as responses to the requests and stored in the setting value storage section or the information including the status stored in the status storage section, whether the communication section of each of the wireless LAN relay devices encrypts the packet, and when any of the packets for at least one of the wireless LAN relay devices is determined not to be encrypted, receive from the user a selection to encrypt the packet for the at least one of the wireless LAN relay devices which is not encrypted. The instruction section may transmit, when the request obtaining section receives the selection to encrypt the packet, the setting instruction to the at least one of the wireless LAN relay devices for which the packet is not encrypted.

With this configuration, after receiving the user's selection to encrypt packets, the outer device of the wireless communication system transmits the setting instructions to all the wireless LAN relay devices for which packets are not encrypted. Thus, the security settings can be performed in the wireless communication system including a plurality of wireless LAN relay devices simply and easily.

BRIEF DESCRIPTION OF THE DRAWINGS

FIG. 8 is a diagram illustrating how the setting values are overwritten with the preset values in the security setting process illustrated in FIG. 6;

FIG. 10 is a diagram illustrating how the setting values are overwritten with the preset values in the security setting process illustrated in FIG. 6;

FIG. 18 is a sequence diagram illustrating a procedure of a security setting process according to a fourth embodiment of the present invention.

DESCRIPTION OF THE PREFERRED EMBODIMENTS

Embodiments of the present invention will now be described.

Figure 1:
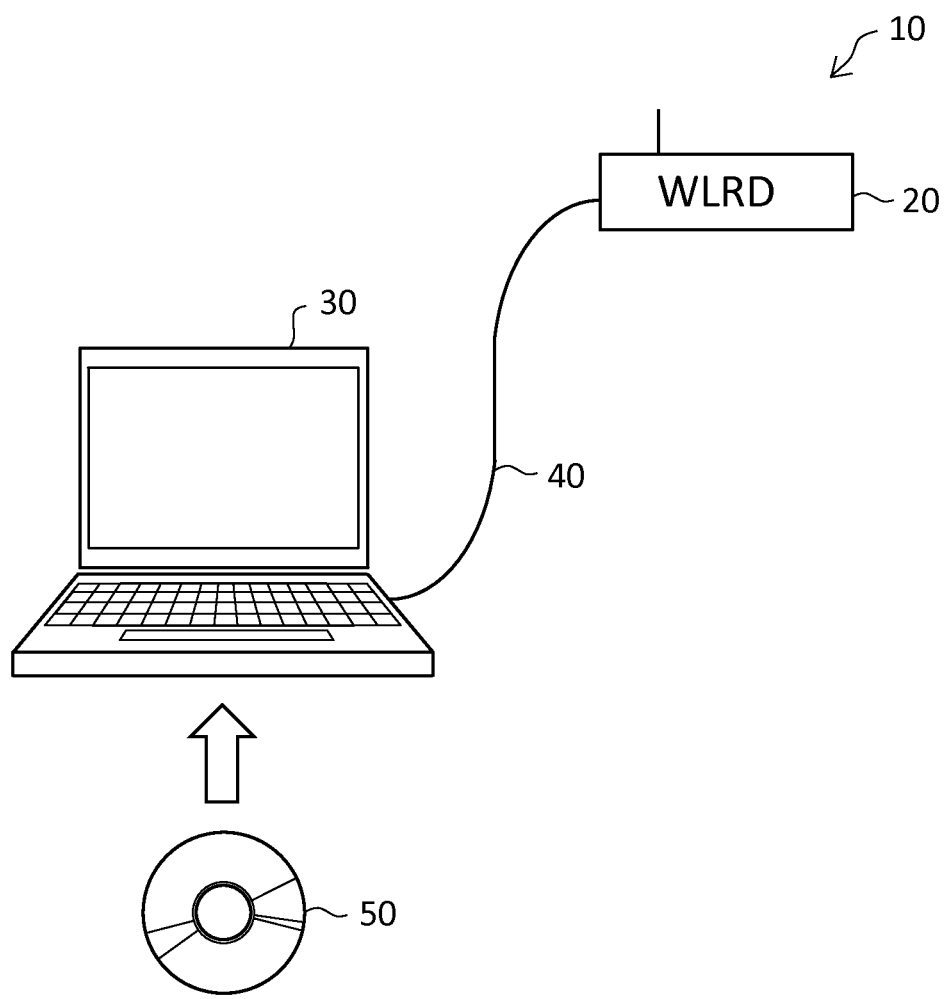
FIG. 1 is a diagram illustrating a schematic configuration of a wireless communication system according to a first embodiment of the present invention.

FIG. 1 is a diagram illustrating a schematic configuration of a wireless communication system according to a first embodiment of the present invention. A wireless communication system 10 according to the first embodiment includes a wireless LAN access point functioning as a wireless LAN relay device (hereinafter also referred to as "WLRD") 20 and a personal computer (hereinafter also referred to as "PC") 30 which is an outer device equipped with a wireless LAN connection device. In a security setting process to be described later, the WLRD 20 and the PC 30 are connected by means of a LAN cable 40 (that is, wiredly connected) as illustrated in FIG. 1. In the PC 30, a computer program which is preliminarily stored in a Compact Disc (CD) 50 is installed to form a process section to be used in the security setting process described later.

Figure 2:
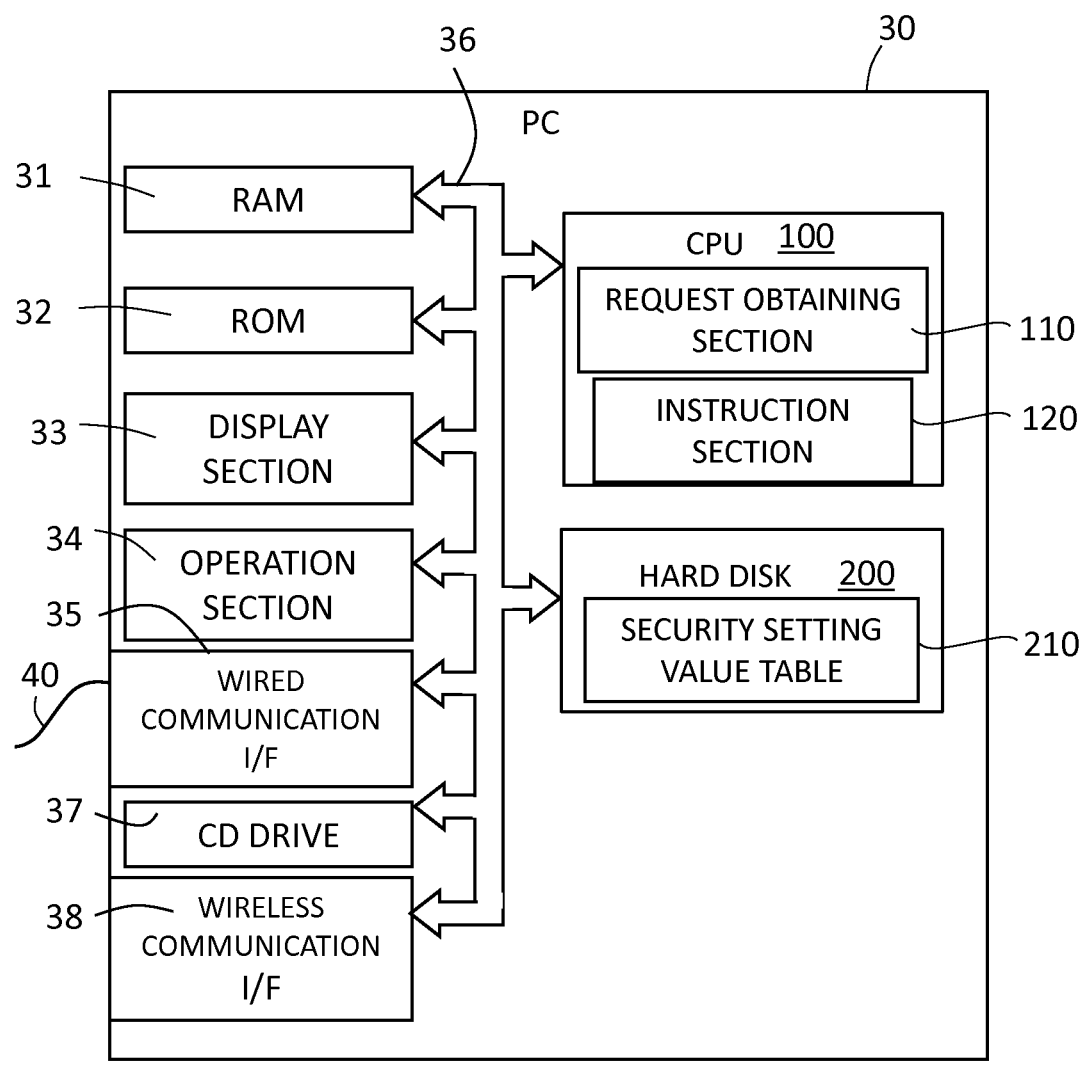
FIG. 2 is a diagram illustrating a schematic configuration of a PC used in the first embodiment.

FIG. 2 is a diagram illustrating a schematic configuration of the PC 30 according to the first embodiment. The PC 30 includes a Random Access Memory (RAM) 31, a Read Only Memory (ROM) 32, a display section 33, an operation section 34, a wired communication interface (I/F) 35, a CD drive 37 which is configured to read the CD 50, a wireless communication interface 38 which enables wireless communication in a wireless LAN, a CPU 100, and a hard disk 200, all of which are mutually connected by means of a bus 36.

The CPU 100 controls the respective components in the PC 30 by extracting a computer program stored in the hard disk 200 onto the RAM 31 and by executing the program. The CPU 100 also functions as a request obtaining section 110 and an instruction section 120 by extracting a computer program, which is installed from the CD 50 and stored in the hard disk 200, onto the RAM 31 and by executing the program. The functions of the request obtaining section 110 and the instruction section 120 will be described later in detail.

The display section 33 includes a display and a display driver, which are not shown, and has a function of performing a visual screen display for a user. The operation section 34 includes a mouse, a keyboard, and drivers therefor, which are not shown, and has a function of receiving input operations by the user. The LAN cable is connected to the wired communication interface 35 for a local area network (LAN) connection.

The hard disk 200 has stored therein a security setting value 210. The security setting value 210 stores therein setting values in tabular form relating to security settings used to wirelessly connect the PC 30 to the WLRD 20. The security setting value 210 stores therein the same contents as in a setting value 410 of the WLRD 20 which will be described later.

Figure 3:
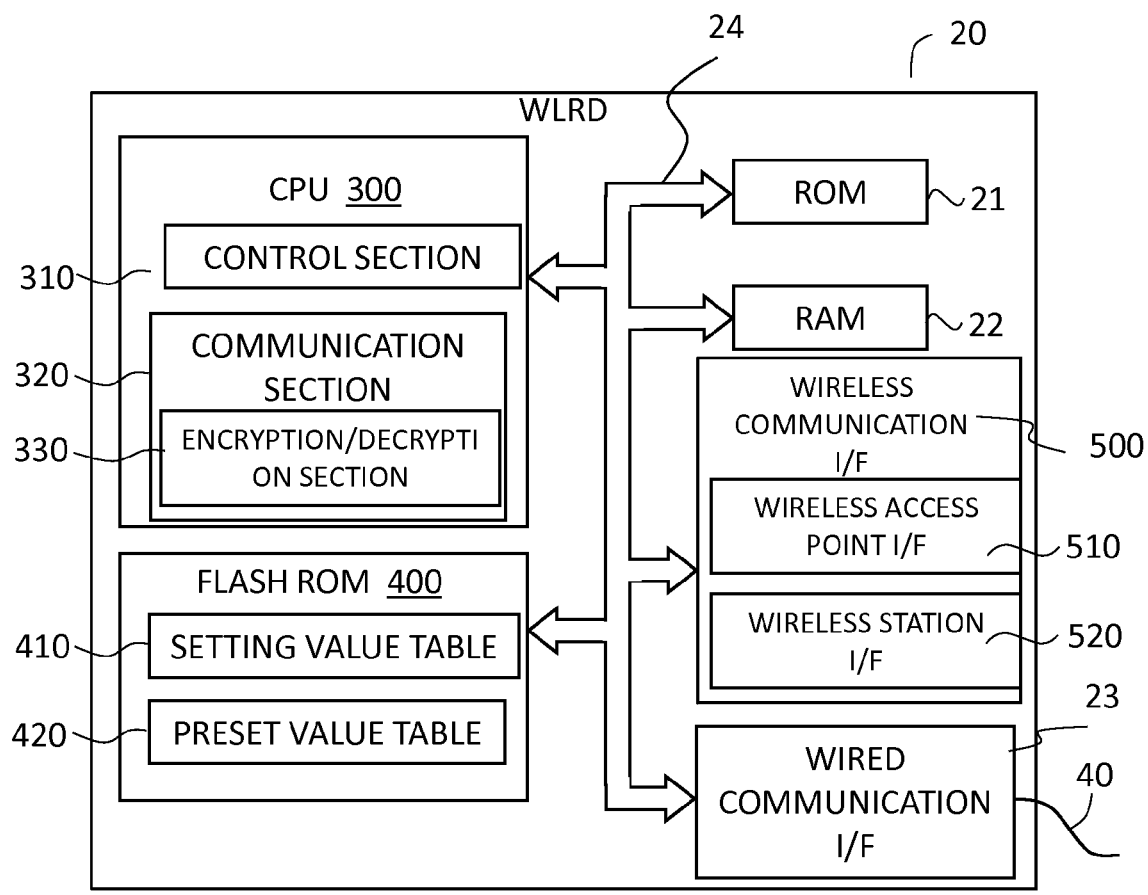
FIG. 3 is a diagram illustrating a schematic configuration of a wireless LAN relay device used in the first embodiment.

FIG. 3 is a diagram illustrating a schematic configuration of the WLRD 20 according to the first embodiment. The WLRD 20 includes a ROM 21, a RAM 22, a wired communication interface (I/F) 23, a CPU 300, a flash ROM 400, and a wireless communication interface 500, all of which are mutually connected by means of a bus 24.

The CPU 300 controls the respective components in the WLRD 20 by extracting a computer program stored in the ROM 21 onto the RAM 22 and by executing the program. The CPU 300 also functions as a control section 310, a communication section 320, and an encryption/decryption section 330 by extracting firmware stored in the flash ROM 400 onto the RAM 22 and executing the firmware. The function of the control section 310 will be described later in detail. The communication section 320 has a function of controlling wired communication between the PC 30 and the WLRD 20, which are connected via the wired communication interface 23. The communication section 320 also has a function of controlling wireless communication (communication using packets) between the WLRD 20 and the PC 30 which is wirelessly connected to the WLRD 20, based on the contents defined in the setting value 410 to be described later. The communication section 320 enables wireless LAN communication at least based on the Institute of Electrical and Electronics Engineers (IEEE) 802.11 standard. The encryption/decryption section 330 is a module included in the communication section 320, and is invoked and used by the communication section 320 when the communication section 320 encrypts packets and when the communication section 320 decrypts encrypted packets. The flash ROM 400, functioning as a setting value storage section and a preset value storage section, stores therein the setting value 410 and a preset value 420.

The wireless communication interface section 500 is used for wireless communication, and includes a wireless access point interface 510 and a wireless station interface 520. The wireless access point interface 510 functions as an access point to wirelessly transmit packets to and/or receive packets from other wireless communication devices that function as stations. The wireless station interface 520 functions as a station to wirelessly transmit packets to and/or receive packets from other wireless communication devices that function as access points. The wireless access point interface 510 and the wireless station interface 520 are embedded in the WLRD 20 to enable transmission/reception of radio waves to/from the outside. The respective functional components in the CPU 300 perform communication with other wireless communication devices via the interfaces. The wireless access point interface 510 and the wireless station interface 520 may be configured with a single wireless module, or may be configured individually with different modules. The LAN cable 40 is connected to the wired communication interface 23 to enable a connection between the WLRD 20 and a local area network (LAN).

Figure 4:
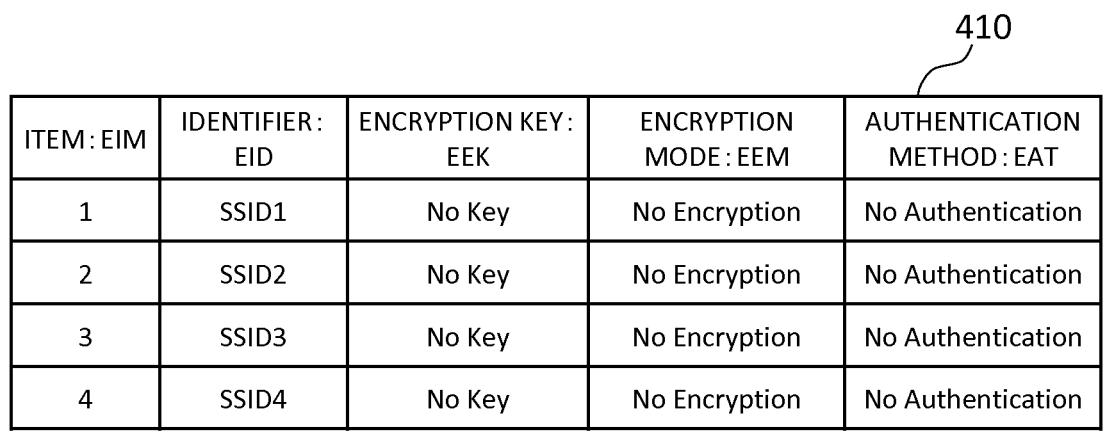
FIG. 4 is a table illustrating examples of setting values according to the first embodiment.

FIG. 4 is a diagram illustrating an example of the setting value 410. The setting value 410 stores therein setting values in tabular form relating to current security of the WLRD 20. The setting value 410 includes an item EIM field, an identifier EID field, an encryption key EEK field, an encryption mode EEM field, and an authentication method EAT field. The setting values relating to security represent security setting values used for encrypting packets such as encryption keys and encryption methods (methods used for encryption, methods used for authentication). Encryption keys and encryption methods illustrated in the drawings are basically defined by the IEEE 802.11 standard, and the codes also defined by the IEEE 802.11 standard are used for representing the respective encryption keys and encryption methods. Thus, the standard should be referred to for details of the encryption keys and encryption methods, and description thereof will not be given herein.

The item EIM field includes numbers which are unique to respective entries stored in the setting value 410, and are used to identify the entries. The identifier EID field stores identifiers (SSID: Service Set Identifier) for identifying a plurality of logical wireless networks (hereinafter referred to as "logical wireless network(s)") in which the WLRD 20 is configured to operate. The encryption key EEK field stores encryption keys (hereinafter also referred to as "current encryption key(s)") which the communication section 320 uses for encryption of packets. The encryption mode EEM field stores encryption modes which the communication section 320 uses for encryption of packets. The authentication method EAT field stores authentication methods which the communication section 320 uses for encryption of packets. It should be noted that a combination of the encryption mode and the authentication method is also referred to as an "encryption method". The encryption method which the communication section 320 uses for encryption of packets is also referred to as a "current encryption method".

The WLRD 20 in this embodiment is a wireless LAN relay device which has multiple SSID functions configured to operate a plurality of logical wireless networks. In the setting value 410, current encryption keys and current encryption methods are stored while associating therewith SSID identifiers (values in the identifier EID field) for identifying the respective logical wireless networks. The tabularized setting value 410 is configured to be readable and writable. The contents of the setting value 410 can be used not only for encryption but also for decryption, which are both performed by the communication section 320.

Referring to FIG. 4, in the initial state of the WLRD 20, entries identified as item EIMs 1 to 4 are each assigned with a value of "No Key" as the value in the encryption key EEK field, a value of "No Encryption" as the value in the encryption mode EEM field, and a value of "No Authentication" as the value in the authentication method EAT field, and the values are stored respectively. This means that, in the initial state of the WLRD 20, none of the packets for the logical wireless networks are encrypted.

Figure 5:
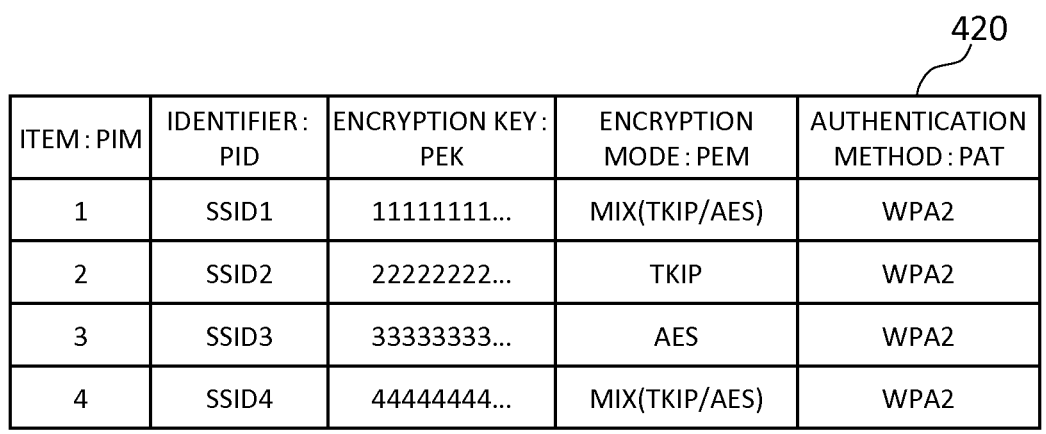
FIG. 5 is table illustrating examples of preset values according to the first embodiment.

FIG. 5 is a diagram showing an example of the preset value 420. The preset value 420 preliminarily stores therein default setting values, in tabular form, which are used when security is applied to the WLRD 20. The preset value 420 includes an item PIM field, an identifier PID field, an encryption key PEK field, an encryption mode PEM field, and an authentication method PAT field.

The item PIM field includes numbers which are unique to respective entries stored in the preset value 420, and are used to identify the entries. The identifier PID field stores identifiers (SSID) for identifying a plurality of logical wireless networks in which the WLRD 20 is configured to operate. The encryption key PEK field stores preliminarily determined encryption keys (hereinafter also referred to as "predetermined encryption key(s)". The encryption mode PEM field stores preliminarily determined encryption modes. The authentication method PAT field stores preliminarily determined authentication methods. The preliminarily determined encryption method (combination of the encryption mode and the authentication method) is also referred to as a "predetermined encryption method".

In the preset value 420, predetermined encryption keys and predetermined encryption methods are stored while associating therewith SSID identifiers (values in the identifier PID field) for identifying the respective logical wireless networks. Preferably, in the present embodiment, the tabularized preset value 420 is readably configured.

Figure 6:
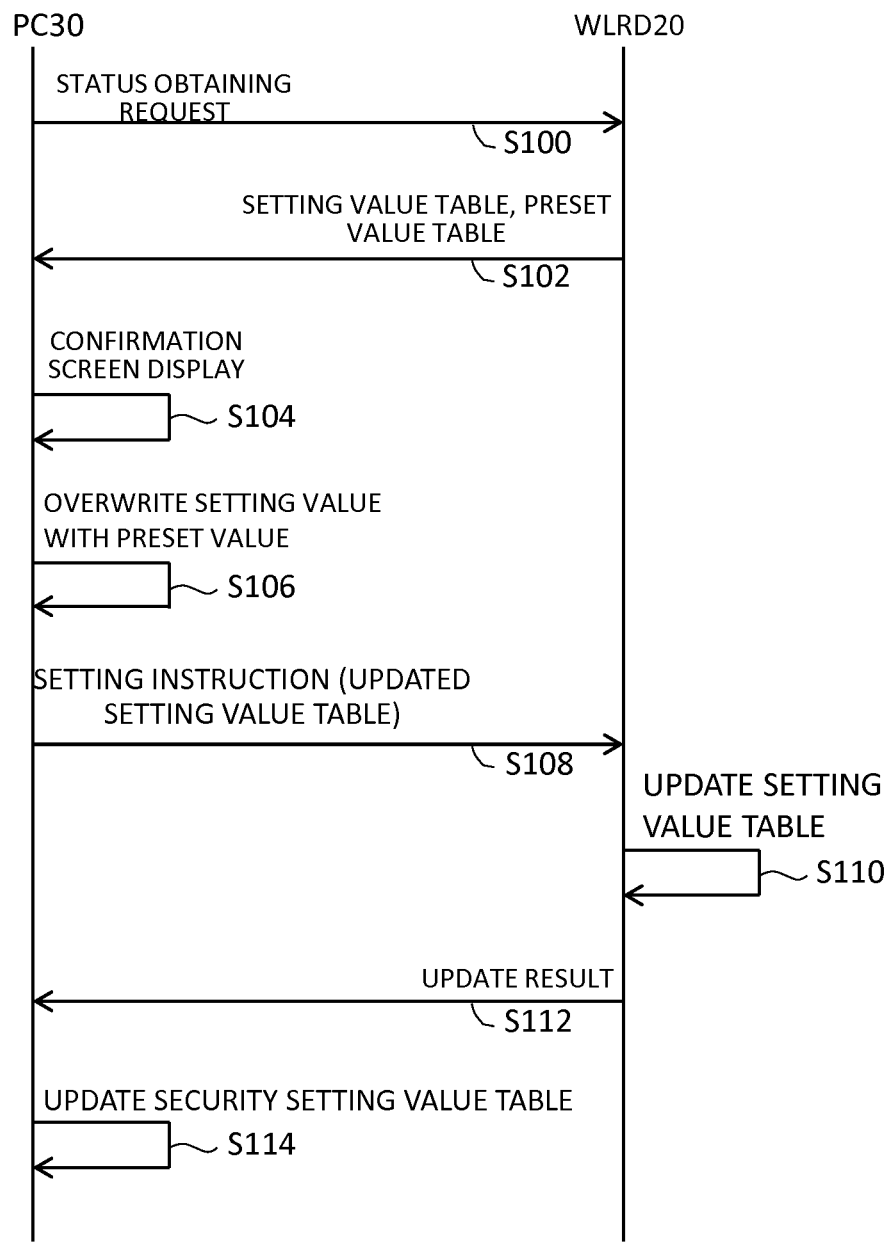
FIG. 6 is a sequence diagram illustrating a procedure of a security setting process according to the first embodiment.

Next, with reference to FIGS. 6 to 8, the security setting process according to the first embodiment of the present invention will be described. FIG. 6 is a sequence diagram illustrating a procedure of the security setting process according to the first embodiment. During the security setting process, the PC 30 and the WLRD 20 are wiredly connected with each other by means of the LAN cable 40, as described above. The request obtaining section 110 of the PC 30 transmits a request to the WLRD 20 to obtain a security status of the WLRD 20 (step S100). After reception of the request, the control section 310 of the WLRD 20 transmits to the PC 30 the contents stored in the setting value 410 (values in the item EIM field, the identifier EID field, the encryption key EEK field, the encryption mode EEM field, and the authentication method EAT field) and the contents stored in the preset value 420 (values in the item PIM field, the identifier PID field, the encryption key PEK field, the encryption mode PEM field, and the authentication method PAT field) (step S102).

The request obtaining section 110 of the PC 30, which has received the response from the WLRD 20, determines based on the contents stored in the setting value 410 whether packets for the respective logical wireless networks are indicated as encrypted. Specifically, if the value of the identifier EID is "SSID1", and the value of the encryption key EEK is "No Key", for example, the request obtaining section 110 determines that a packet for the logical wireless network identified as the SSID1 is indicated as not encrypted. The determination can also be made using values of other items than the encryption key EEK (such as the encryption mode EEM or the authentication method EAT). The request obtaining section 110 determines whether a packet for each logical wireless network is indicated as encrypted, and if it determines that a packet for logical wireless network is indicated as not encrypted, a confirmation screen is displayed on the display section 33 (FIG. 2) (step S104).

Figure 7:
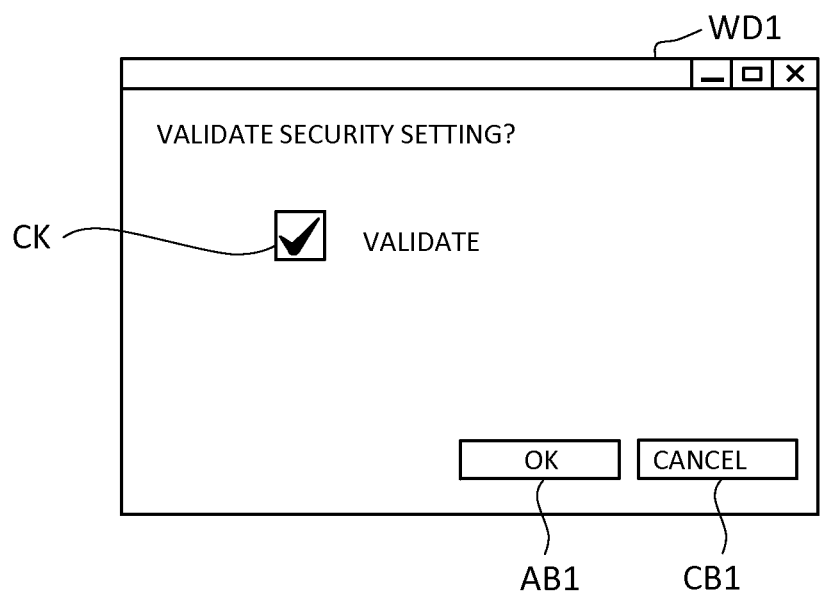
FIG. 7 is a diagram illustrating an example of a confirmation screen displayed in the security setting process illustrated in FIG. 6.

FIG. 7 is a diagram illustrating an example of the confirmation screen displayed in step S104 of the security setting process illustrated in FIG. 6. A confirmation screen WD1 includes a check box CK, an OK button AB1, and a cancel button CB 1. If a user of the wireless communication system 10 is to cancel the security setting process, the user presses the cancel button CB 1. Upon pressing of the cancel button CB 1, the process illustrated in FIG. 6 ends.

On the other hand, if the user is to continue the security setting process, the user of the wireless communication system 10 ticks the check box CK, and presses the OK button AB1. When the OK button AB1 is pressed while the check box CK is ticked, the request obtaining section 110 determines that the user has selected to perform encryption of a packet in the WLRD 20, and continues the process.

The instruction section 120 of the PC 30 overwrites the values in the setting value 410 (step S106) with the corresponding values in the preset value 420. Specifically, the instruction section 120 extracts data of entries in the preset value 420 received in step S102 and data of entries in the setting value 410 received in step S102 that each have the same identifier (i.e., the identifiers EID are the same as the respective identifiers PID), and then overwrites, with the respective values in the preset value 420 (in the encryption key PEK field, the encryption mode PEM field, and the authentication method PAT field), the corresponding values in the setting value 410 (in the encryption key EEK field, the encryption mode EEM field, and the authentication method EAT field). The encryption key EEK which is overwritten with the encryption key PEK in the preset value 420 is also referred to as an "updated encryption key". A combination of the encryption mode EEM which is overwritten with the encryption mode PEM in the preset value 420, and the authentication method EAT which is overwritten with the authentication method PAT, is also referred to as an "updated encryption method". Such overwriting of data is preferably performed for those packets of the logical wireless networks determined in step S104 as being indicated as not encrypted.

The instruction section 120 of the PC 30 transmits a setting instruction to the WLRD 20 (step S108). The setting instruction includes the items EIM, the identifiers EID, the updated encryption keys, and the updated encryption methods, which were derived in step S106. Upon reception of the setting instruction, the control section 310 of the WLRD 20 updates the setting value 410 stored in the flash ROM 400 with the values included in the setting instruction received in step S108 (step S110). Specifically, the control section 310 extracts each entry in the setting value 410 whose identifier EID is the same as an identifier EID included in the setting instruction, and overwrites, with the data of an entry identified by the identifier EID in the setting instruction, the entry of the identifier EID in the setting value 410.

Thereafter, the control section 310 transmits the update result (success/failure) to the PC 30 (step S112). If the update result indicates "success", the instruction section 120 of the PC 30 updates the security setting value 210 stored in the hard disk 200 with the updated encryption keys and the updated encryption methods (step S114).

FIG. 8 is a diagram illustrating how the values in the setting value 410 are overwritten with the corresponding values in the preset value 420 in step S106 illustrated in FIG. 6. The security status obtaining section 110 of the PC 30 determines that packets for the logical wireless networks that are not encrypted have the identifiers SSID1 to SSID4 (FIG. 4, step S104 in FIG. 6). The instruction section 120 of the PC 30 overwrites the values in the setting value 410 with the corresponding values in the preset value 420 for the respective logical wireless networks having the identifiers SSID1 to SSID4. For example, values of the encryption key EEK, the encryption mode EEM, and the authentication method EAT that are associated with the identifier EID of SSID1 in the setting value 410 are overwritten with corresponding values of the encryption key PEK, the encryption mode PEM, and the authentication method PAT that are associated with the identifier PID of SSID1 in the preset value 420.

As described above, in the first embodiment, upon reception of the setting instruction from the PC 30, the control section 310 of the WLRD 20 overwrites the current encryption keys (encryption key EEK) and the current encryption methods (encryption mode EEM, authentication method EAT), which are stored in the setting value storage section (setting value 410) to be used for packet encryption, with the updated encryption keys (obtained by overwriting the encryption key EEK with the encryption key PEK in the preset value 420) and the updated encryption methods (obtained by overwriting the encryption mode EEM and the authentication method EAT with the encryption mode PEM and the authentication method PAT in the preset value 420, respectively), which were derived by the outer device, i.e., PC30. That is, after receiving the setting instruction from the PC 30, the WLRD 20 performs encryption of packets using the updated encryption keys and updated encryption methods, which are encryption keys and encryption methods preliminarily defined in the WLRD 20. Thus, security setting can be performed on the WLRD 20 simply and easily.

Figure 9A:
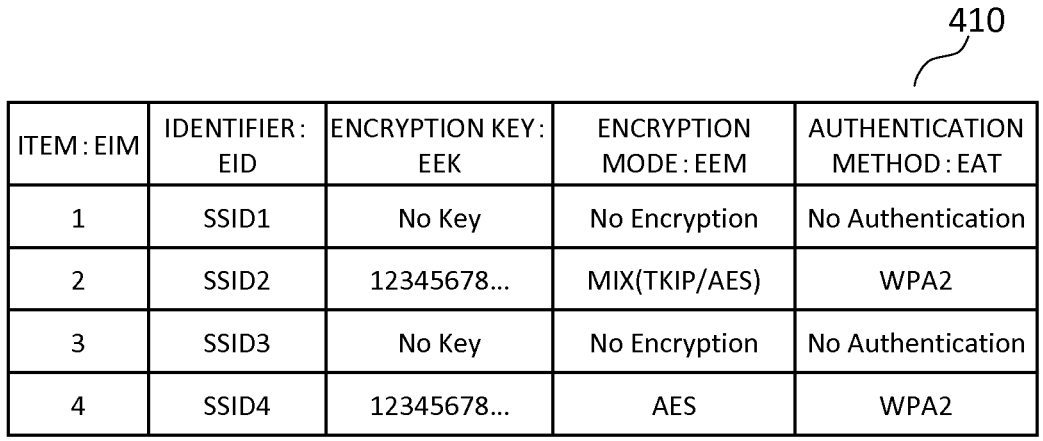
FIG. 9A is a table illustrating examples of setting values set in the security setting process illustrated in FIG. 6.
Figure 9B:
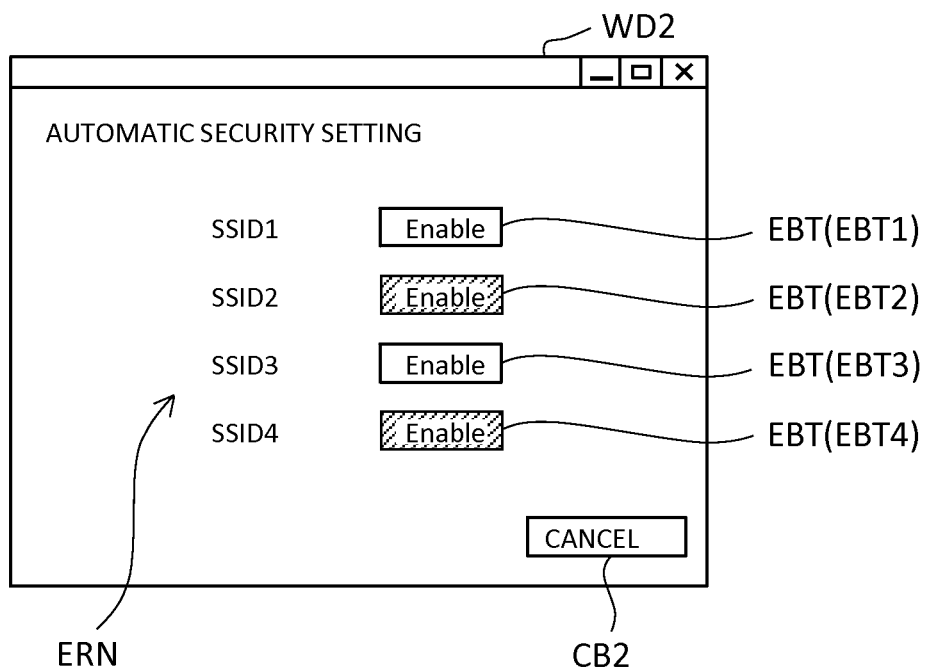
FIG. 9B is a diagram illustrating another example of the confirmation screen displayed in the security setting process illustrated in FIG. 6.

FIG. 9B is a diagram illustrating another example of a confirmation screen displayed in step S104 of the security setting process illustrated in FIG. 6. FIG. 9A is a diagram illustrating an example of the setting value 410 in this case. As illustrated in FIG. 9A, with respect to the entries defined by items EIM2 and 4, setting values are stored in the fields of the encryption key EEK, encryption mode EEM, and authentication method EAT to enable the security. That is, in the WLRD 20 having the above-described setting value 410, packets for the logical wireless networks identified by the identifiers SSID2 and SSID4 are encrypted, whereas packets for the logical wireless networks identified by the identifiers SSID1 and SSID3 are not encrypted.

In FIG. 9B, a confirmation screen WD2 includes an identifier list ERN, select buttons EBT, and a cancel button CB2. The identifier list ERN is a list of identifiers for respective logical networks. The select buttons EBT are allocated to the identifiers for the respective logical networks. Preferably, each select button EBT is displayed to indicate the state of whether selection is enabled or disenabled depending on the contents set in the setting value 410. For example, based on the contents stored in the setting value 410, the request obtaining section 110 can perform controlling so as to gray out the select buttons EBT (displayed hatched in the figure) of logical wireless networks for which packets are determined to be encrypted. That is, if the contents of the setting value 410 are those illustrated in FIG. 9A, packets for the entries defined by the items EIM2, EIM4 are encrypted, and thus the select buttons EBT2 and EBT4 are grayed out. Accordingly, it is possible to avoid updating the setting values which enable the security and are already stored in the setting value 410.

Instead of ticking the check box CK and pressing the OK button AB1 in the confirmation screen WD1 illustrated in FIG. 7, a user of the wireless communication system 10 presses, in the confirmation screen WD2 illustrated in FIG. 9B, the select button EBT that is allocated to the identifier for a logical network for which the user is to perform the security setting process. After the select button EBT is pressed, the request obtaining section 110 continues the security setting process in FIG. 6, regarding that the user has selected to perform encryption of a packet for the selected logical network of the WLRD 20.

In step S106 of the security setting process in FIG. 6, the instruction section 120 of the PC 30 uses data of only the logical wireless network that is selected in the screen illustrated in FIG. 9B, and overwrites the values of the setting value 410 with the relevant values in the preset value 420. In step S108, the instruction section 120 of the PC 30 transmits to the WLRD 20 a setting instruction including values of the item EIM, the identifier EID, the updated encryption key, and the updated encryption method, which were derived in step S106, that is, the setting instruction including data of only the logical wireless network selected in the screen in FIG. 9B. Accordingly, upon reception of the setting instruction, the control section 310 of the WLRD 20 overwrites the current encryption key and the current encryption method which are associated with the identifier (identifier EID) included in the setting instruction (step S110).

FIG. 10 is a diagram illustrating how values in values in the setting value 410 are overwritten with the preset value 420 in step S106 illustrated in FIG. 6. If a select button EBT1 is pressed in the confirmation screen WD2 in FIG. 9B, the instruction section 120 of the PC 30 overwrites, with values in the preset value 420 relating to the logical wireless network having the identifier SSID1, the corresponding values in the setting value 410.

The screen illustrated in FIG. 9B is merely an example, and various modes can be adopted. For example, the confirmation screen WD2 may include, in place of the select button EBT, a plurality of check boxes corresponding to the respective items in the identifier list ERN, and an OK button. In this case, if a user selects one or more check boxes and presses the OK button, the user can perform the security setting process for the selected logical wireless networks simultaneously.

As described above, with the confirmation screen WD2, when the communication section 320 of the WLRD 20 receives a setting instruction from the PC 30, the control section 310 overwrites the current encryption keys (encryption key EEK) and the current encryption methods (encryption mode EEM and authentication method EAT) which are associated with the identifiers (SSID) identifying one or more logical wireless networks included in the setting instruction. Accordingly, in the WLRD 20 which is configured to operate in a plurality logical wireless networks (having multiple SSID functions), security settings can be performed simply and easily for individual logical wireless networks.

Figures 11A, 11B:
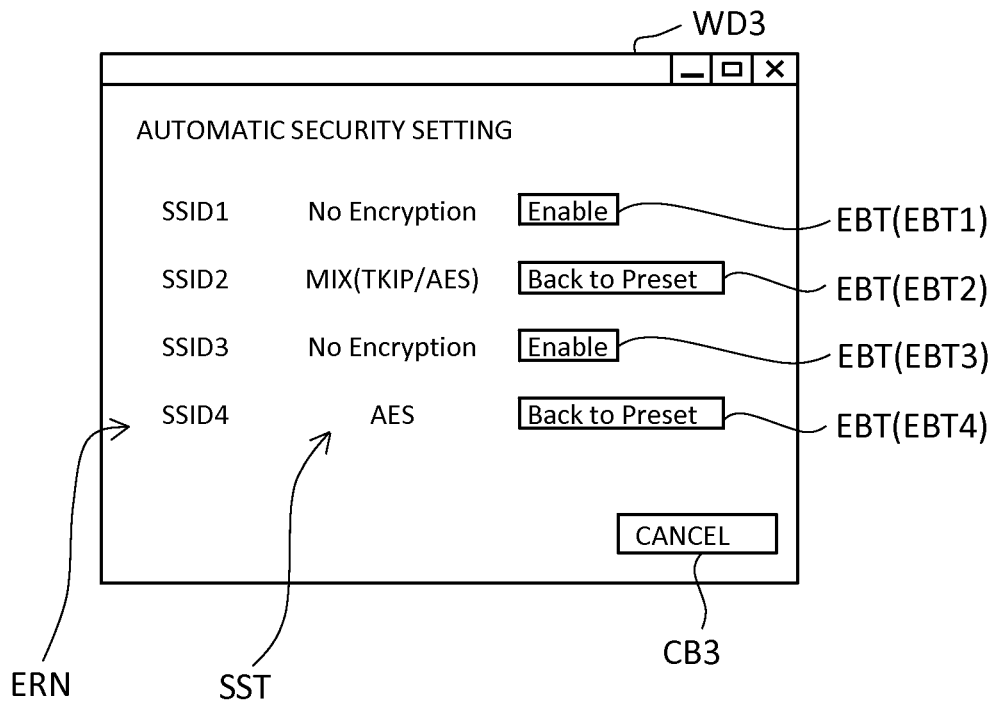
FIG. 11A is a table illustrating another example of setting values set in the security setting process illustrated in FIG. 6.
FIG. 11B is a diagram illustrating another example of the confirmation screen displayed in the security setting process illustrated in FIG. 6.

FIG. 11B is a diagram illustrating another example of a confirmation screen displayed in step S104 of the security setting process illustrated in FIG. 6. FIG. 11A is a diagram illustrating an example of the setting value 410 in this case. Since the details of FIG. 11A are the same as those in FIG. 9A, no description thereof will be given.

Referring to FIG. 11B, a confirmation screen WD3 includes the identifier list ERN, a security setting status display column SST, the select buttons EBT, and a cancel button CB 3. The identifier list ERN is a list of identifiers for a plurality of logical networks. The security setting status display column SST displays the status of the security setting for each logical network. For example, as illustrated in FIG. 11B, the status of the security setting may be indicated as values of the encryption mode EEM field in the setting value 410. Alternatively, the status may be indicated by "security enable", "security disenable", or the like.

The select buttons EBT are allocated to the identifier identifying the respective logical networks. Preferably, the select buttons EBT are configured to have various functions depending on the contents set in the setting value 410. For example, based on the contents stored in the setting value 410, the request obtaining section 110 sets the select buttons EBT for logical wireless networks, for which packets are indicated as not encrypted, to indicate "Enable". Alternatively, the request obtaining section 110 sets the select buttons EBT for the other logical wireless networks, for which packets are indicated as encrypted, to indicate "Back to Preset".

When the user of the wireless communication system 10 presses the select button EBT indicating "Enable", the request obtaining section 110 regards that the user has selected to perform encryption of a packet for the selected logical network in the WLRD 20, and continues the security setting process illustrated in FIG. 6. The details of the process thereafter are the same as those described with reference to FIG. 9B.

When the user of the wireless communication system 10 presses the select button EBT indicating "Back to Preset", the request obtaining section 110 causes the instruction section 120 to perform a process of returning the encryption setting of a packet for the selected logical network in the WLRD 20 to the initial state.

The process of returning the encryption setting of a packet to the initial state is performed as follows. To begin with, the instruction section 120 of the PC 30 updates data of the logical wireless network selected in the screen illustrated in FIG. 11B, that is, updates the encryption key EEK with "No Key", the encryption mode EEM with "No Encryption", the authentication method EAT with "No Authentication", in the setting value 410. Further, the instruction section 120 transmits to the WLRD 20 values of the item EIM, the identifier EID, the updated encryption key, and the updated encryption method, which were derived. That is, the instruction section 12 transmits a setting instruction including only data of the logical wireless network that is selected in the screen illustrated in FIG. 11B. Accordingly, after receiving the setting instruction, the control section 310 of the WLRD 20 overwrites the current encryption key and the current encryption method which are associated with the identifier (identifiers EID) included in the setting instruction with the respective initial setting values.

As described above, with the confirmation screen WD3, when the communication section 320 of the WLRD 20 receives a setting instruction from the PC 30, the control section 310 overwrites the current encryption keys (encryption keys EEK) and the current encryption methods (encryption methods EEM and authentication methods EAT) which are associated with the identifiers (SSID) identifying one or more logical wireless networks included in the setting instruction. Thus, in the WLRD 20 which is configured to operate in a plurality of logical wireless networks (having multiple SSID functions), the security setting can be performed simply and easily for individual logical wireless networks. Further, this configuration makes it possible to return the security setting of a logical network, which is already performed, to the initial setting status (security disenabled status) with a simple operation.

Figure 12:
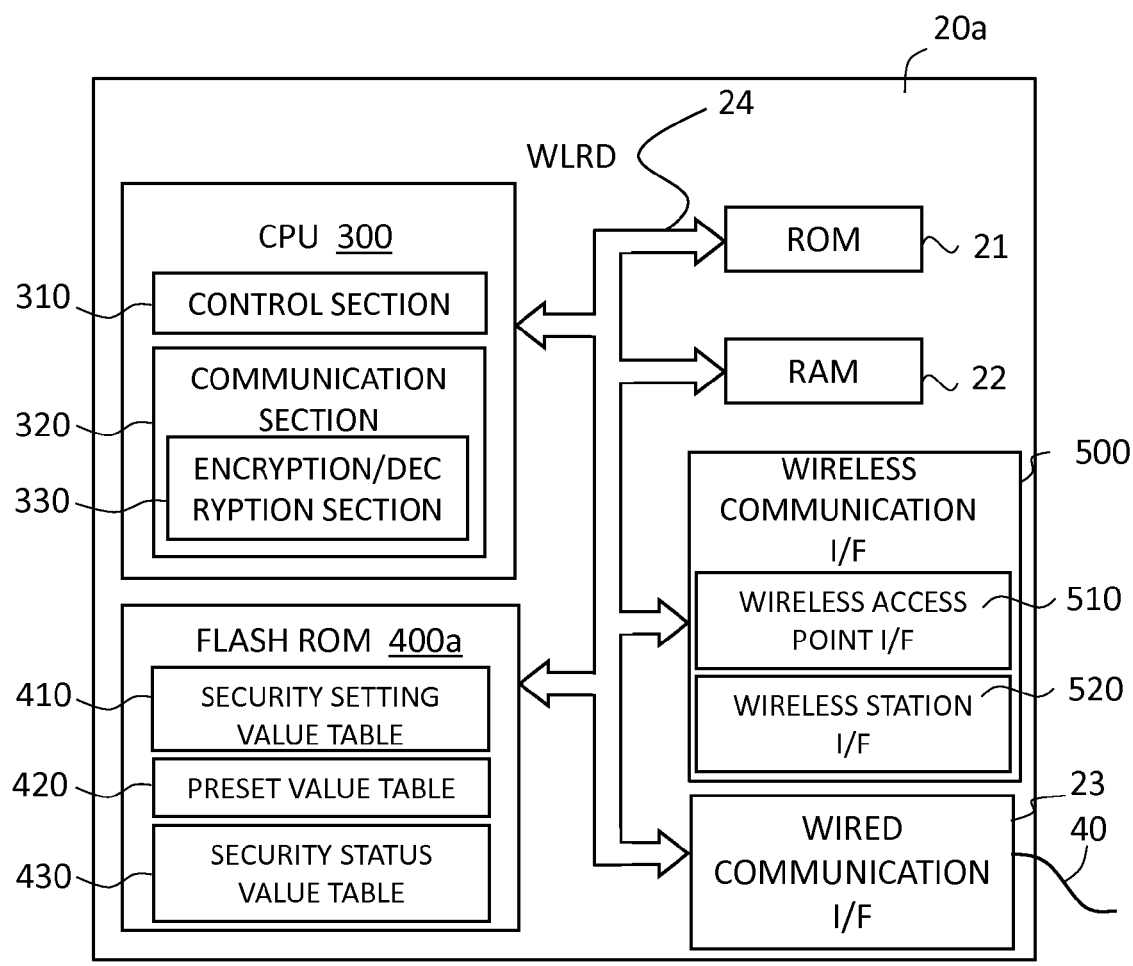
FIG. 12 is a diagram illustrating a schematic configuration of a wireless LAN relay device used in a second embodiment of the present invention.

FIG. 12 is a diagram illustrating a schematic configuration of a WLRD 20a according to a second embodiment of the present invention. The configuration is different from that of the first embodiment illustrated in FIG. 3 in that the configuration is provided with a flash ROM 400a further including a security status value 430. The remaining components of the configuration are the same as those of the first embodiment. Hereinafter, only the component and operation which are different from those of the first embodiment will be described. In the diagram, components which are the same as those of the first embodiment will be denoted by the same reference numerals, and no detailed description thereof will be given.

Figure 13:
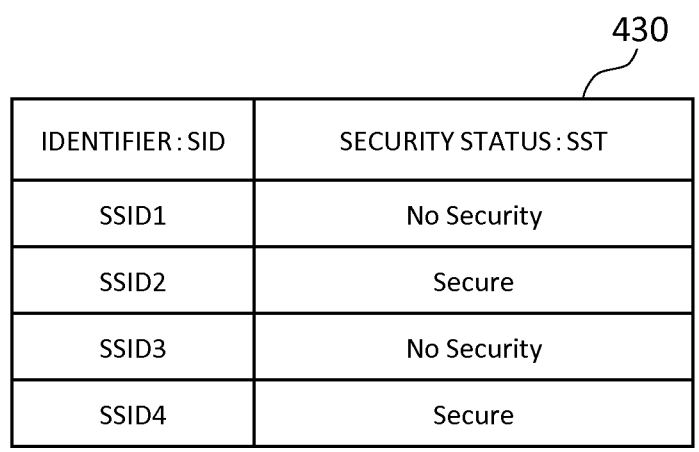
FIG. 13 is a table illustrating examples of security status values according to the second embodiment.

FIG. 13 is a diagram illustrating an example of the security status value 430 according to the second embodiment. The security status value 430 stores statuses of the logical wireless networks in tabular form in which the communication section 320 of the WLRD 20 is configured to operate, that is, statuses indicating whether packets for the respective logical wireless networks are encrypted. The security status value 430 includes an identifier SID field and a security status SST field.

The identifier SID field stores identifiers respectively identifying a plurality of logical wireless networks in which the WLRD 20 is configured to operate. The security status SST field stores the statuses of the respective logical wireless networks, each status indicating whether a packet for the logical wireless network is encrypted. The security status SST field stores, for example, a value indicating "No Security" with respect to a logical wireless network for which a packet is not encrypted, and a value indicating "Secure" with respect to a logical wireless network t for which a packet is encrypted.

Figure 14:
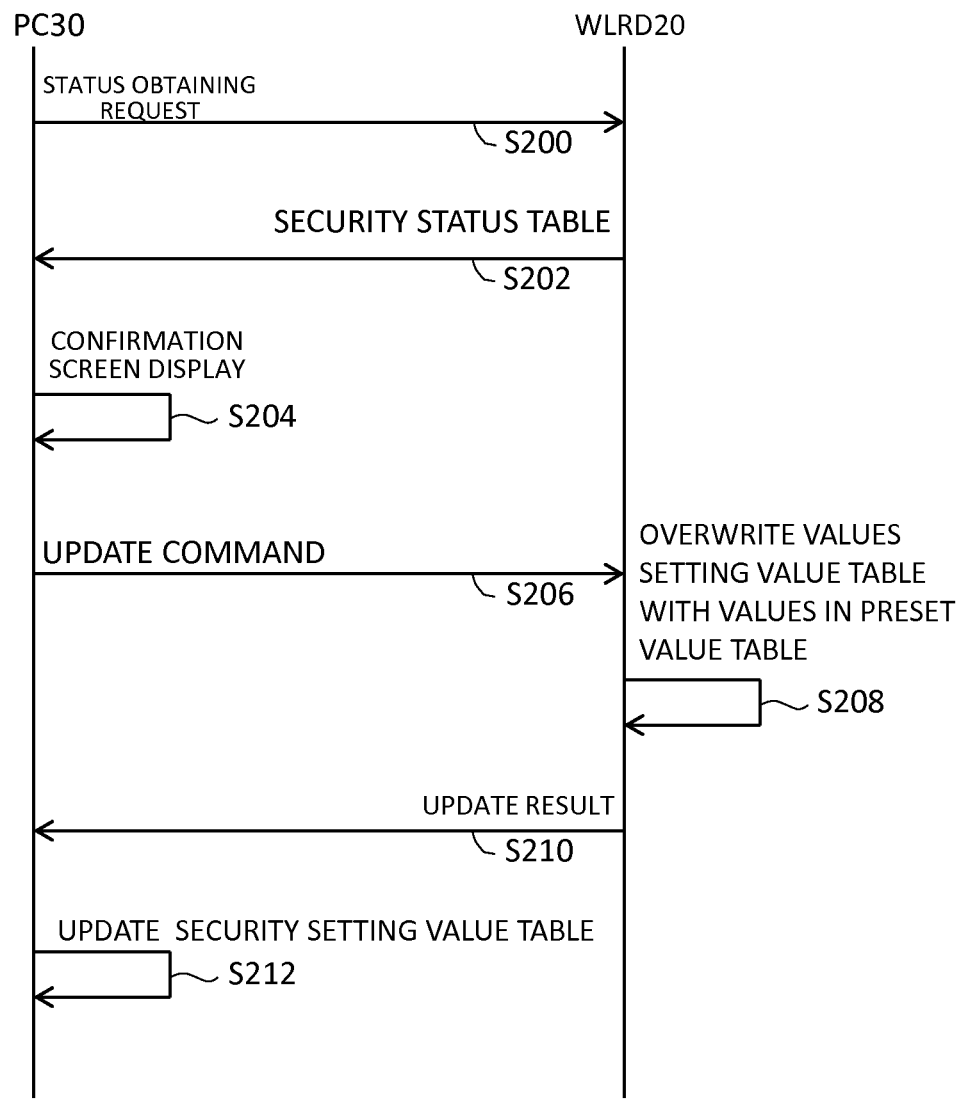
FIG. 14 is a sequence diagram illustrating a procedure of a security setting process according to the second embodiment.

FIG. 14 is a sequence diagram illustrating a procedure of a security setting process according to the second embodiment. The request obtaining section 110 of the PC 30 transmits to the WLRD 20 a request for providing the security status value 430 (step S200). After receiving the request, the control section 310 of the WLRD 20 transmits to the PC 30 the contents stored in the security status value 430 (values in the identifier SID field and the security status SST field) (step S202).

After receiving the response from the WLRD 20, the request obtaining section 110 of the PC 30 determines, based on the contents stored in the security status value 430, whether packets for the respective logical wireless networks are indicated as encrypted. Specifically, for example, if the value of the identifier SID is "SSID1", and the value of the security status SST is "No Security", the request obtaining section 110 determines that the packet for the logical wireless network identified by the SSID1 is indicated as not encrypted. The request obtaining section 110 determines whether encryption is indicated for all the logical wireless networks. If it determines that there is logical wireless network for which a packet is indicated as not encrypted, a confirmation screen is displayed on the display section 33 (step S204). The confirmation screen displayed in step S204 can be any type of screen, for example, the screen illustrated in FIG. 7, FIG. 9B, or FIG. 11B.

A predetermined operation as described above is performed on the confirmation screen, and if the request obtaining section 110 determines that the user has selected to perform encryption of a packet in the WLRD 20, the instruction section 120 of the PC 30 transmits to the WLRD 20 an update command as a setting instruction (step S206). As the update command, such a character string as "Copy Preset", for example, is employed. If the confirmation screen illustrated in FIG. 9B or FIG. 11B is employed, the identifier of the logical network that is selected in the screen can be added as a parameter of the update command.

After receiving the setting instruction, the control section 310 of the WLRD 20 updates the setting value 410 stored in the flash ROM 400a using the preset value 420 also stored in the flash ROM 400a (step S208). Specifically, the control section 310 extracts an entry having an identifier PID in the preset value 420 and an entry having an identifier EID in the setting value 410 that have the same identifier (i.e., the identifier PID is the same as the identifier EID), and overwrites, with the values of the respective fields in the preset value 420 (encryption key PEK, encryption mode PEM, and authentication method PAT), the values of the respective fields in the setting value 410 (encryption key EEK, encryption mode EEM, and authentication method EAT). If the identifiers of logical networks are included in the received update command, only such entries whose identifiers EID are the same as the identifiers of the logical networks are updated. When the identifiers of the logical networks are not included in the received update command, if security setting values are stored in the setting value 410 (if effective values are stored in the encryption key EEK field or the like), no entry is updated preferably.

Thereafter, the control section 310 transmits to the PC 30 the update result (success/failure) (step S210). If the update result indicates "success", the control section 310 transmits to the PC 30 the contents stored in the updated setting value 410 (values in the item EIM field, the identifier EID field, encryption key EEK field, the encryption mode EEM field, and the authentication method EAT field) together with the update result. If the update result indicates "success", the instruction section 120 of the PC 30 updates, based on the contents stored in the received setting value 410, the security setting value 210 stored in the hard disk 200 (step S212).

As described above, in the second embodiment, after receiving the setting instruction from the PC 30, the control section 310 of the WLRD 20 overwrites the current encryption keys (encryption key EEK), the current encryption methods (encryption mode EEM and authentication method EAT), which are stored in the setting value storage section (setting value 410) and are to be used for encryption of packets, with predetermined encryption keys (encryption key PEK) and predetermined encryption methods (encryption mode PEM and authentication method PAT), which are stored in the preset value storage section (preset value 420). That is, by receiving the setting instruction from the PC 30, the WLRD 20 can perform encryption of packets using the updated encryption keys and updated encryption methods, which are encryption keys and encryption methods preliminarily determined in the WLRD 20. Thus, the security setting on the WLRD 20 can be performed simply and easily.

Further, in the second embodiment, in response to the request to the PC 30 for provision of the security status, the PC 30 transmits the contents stored in the security status value 430, and transmits the update command as the setting instruction from the PC 30. Thus, the number of times of transmitting the contents stored in the setting value 410 and those in the preset value 420, performed between the WLRD 20 and the PC 30, can be reduced. As a result, secrecy in the security setting process can be improved.

Figure 15:
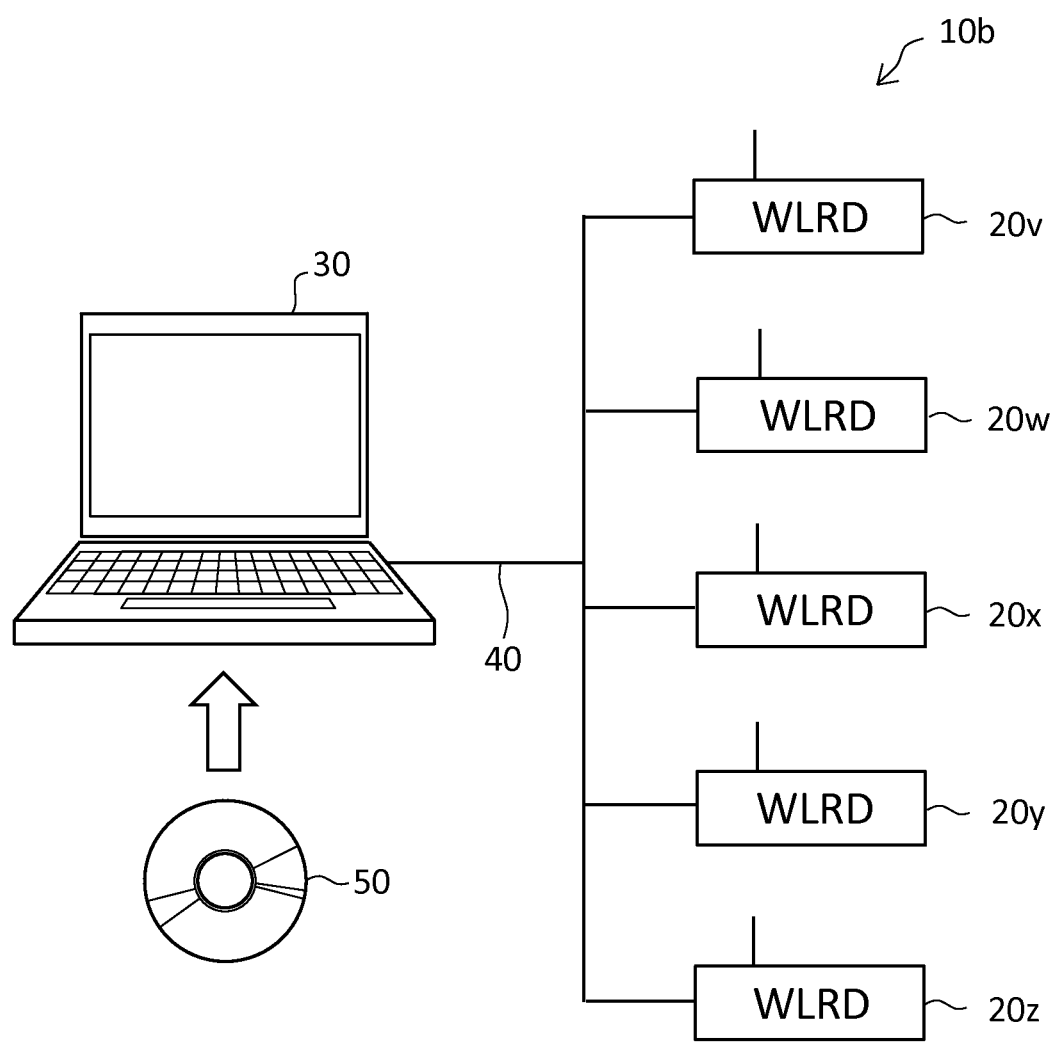
FIG. 15 is a diagram illustrating a schematic configuration of a wireless communication system according to a third embodiment of the present invention.

FIG. 15 is a diagram illustrating a schematic configuration of a wireless communication system 10b according to a third embodiment of the present invention. The configuration in FIG. 15 is different from that of the first embodiment in FIG. 1 in that the configuration includes a plurality of WLRDs (WLRD 20v to WLRD 20z). The remaining components of the configuration are the same as those of the first embodiment. In the description below, only the component and operation which are different from those of the first embodiment will be described, and no description will be given of the components which are the same as those of the first embodiment. In the diagram, components which are the same as those of the first embodiment will be denoted by the same reference numerals, and no detailed description thereof will be given.

Figure 16:
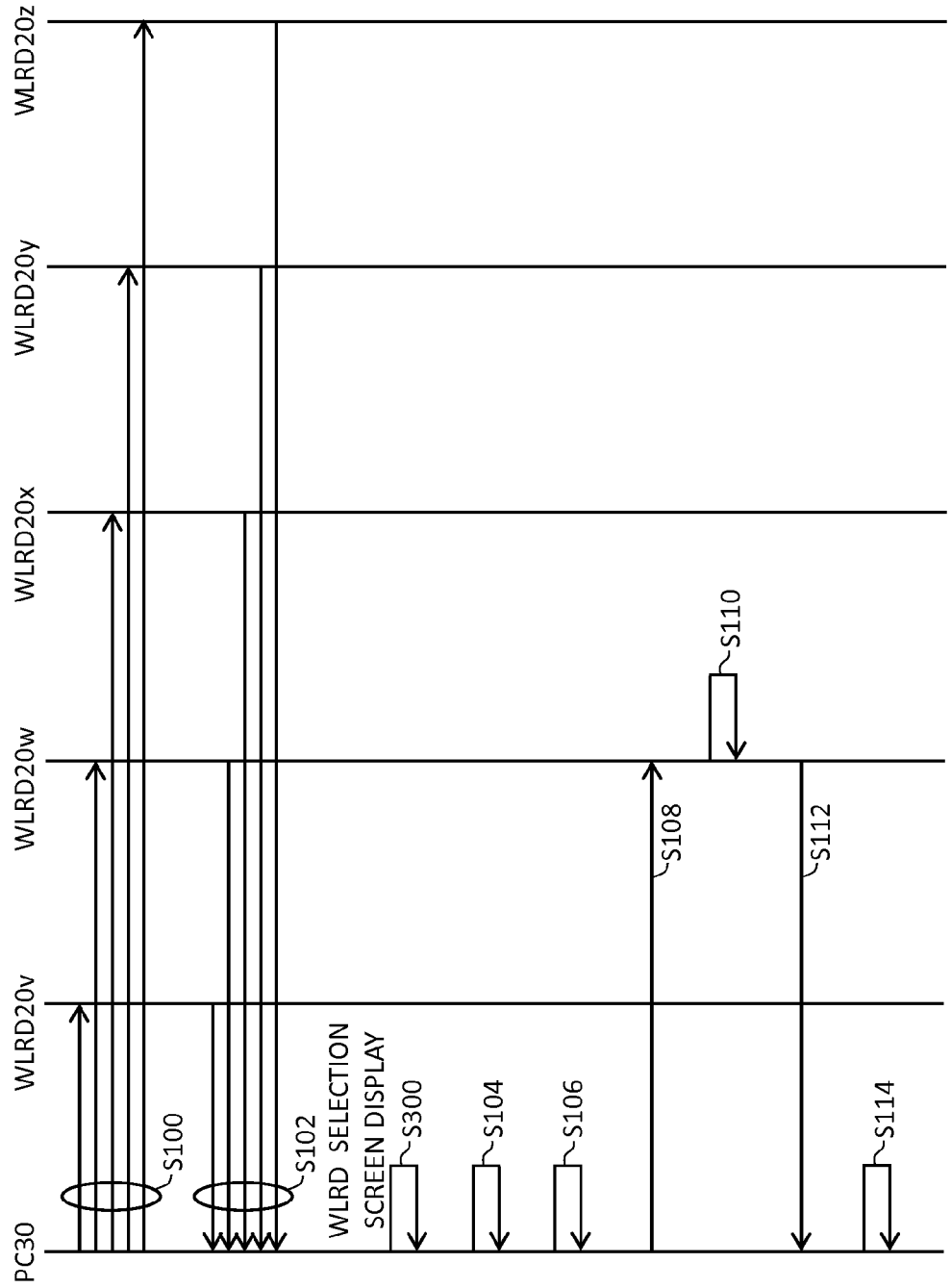
FIG. 16 is a sequence diagram illustrating a procedure of a security setting process according to the third embodiment.

FIG. 16 is a sequence diagram illustrating a procedure of a security setting process according to the third embodiment. The procedure is different from that of the first embodiment illustrated in FIG. 6 in that the procedure includes step S300. Outlines of the remaining processes are the same as those of the first embodiment. Hereinafter, the process which is different from that of the first embodiment will be described.

The request obtaining section 110 of the PC 30 transmits to all WLRDs (WLRD 20v to WLRD 20z) requests for providing their security statuses (step S100). After receiving the request, the control section 310 of each WLRD transmits to the PC 30 the contents stored in its setting value 410 and the contents stored in its preset value 420 (step S102). After receiving a response from each WLRD, the request obtaining section 110 of the PC 30 displays on the display section 33 a screen which receives selection of WLRDs for which security settings are to be performed (step S300).

Figure 17:
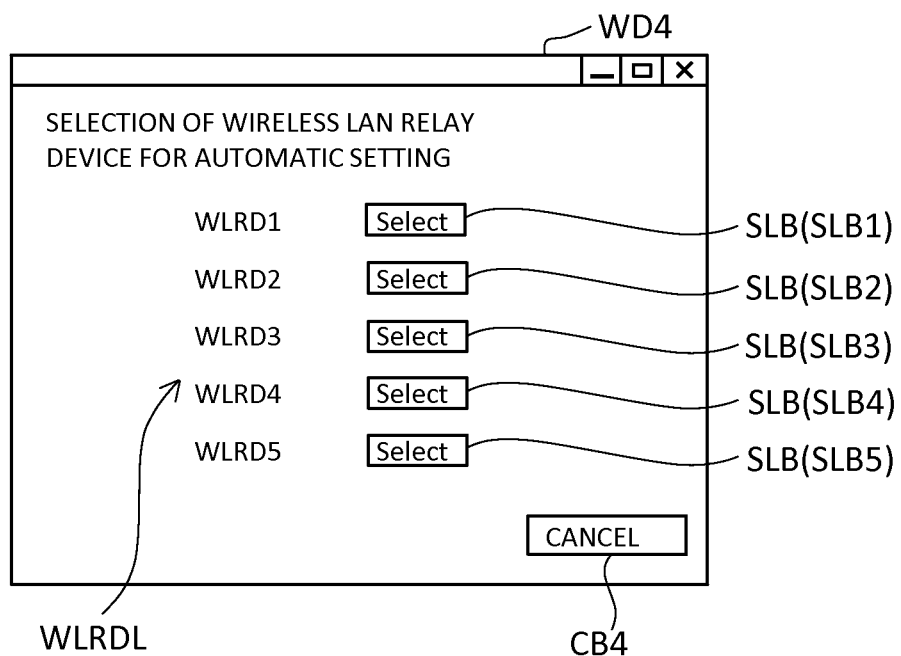
FIG. 17 is a diagram illustrating an example of a wireless LAN relay device select screen, according to the third embodiment, which receives selection of wireless LAN relay devices on which security settings are to be performed.

FIG. 17 is a diagram illustrating an example of a WLRD select screen which receives selection of WLRDs for which security setting are to be performed. An WLRD select screen WD4 includes a WLRD list WLRDL, WLRD select buttons SLB, and a cancel button CB4. The WLRD list WLRDL is a list of identifiers of the plurality of WLRDs. The WLRD select button SLB is allocated to the respective WLRDs. A user of the wireless communication system 10b presses, in the WLRD select screen WD4, WLRD select buttons SLB allocated to WLRDs for which the user is to perform security settings. Upon pressing the WLRD select buttons SLB, the request obtaining section 110 of the PC 30 displays a confirmation screen relating to the selected WLRDs (for example, the screen illustrated in FIG. 7, FIG. 9B, or FIG. 11B) (step S104). When the cancel button CB4 is pressed, the process in FIG. 16 ends. The details of the processes in step S106 and thereafter are the same as those in FIG. 6.

As described above, according to the third embodiment, the same effect as in the first embodiment can be obtained. Further, in the third embodiment, the security settings can be performed simply and easily in a wireless communication system providing a plurality of WLRDs.

FIG. 18 is a sequence diagram illustrating a procedure of a security setting process according to a fourth embodiment of the present invention. The configuration of the wireless communication system according to the fourth embodiment is the same as that of the third embodiment illustrated in FIG. 15.

The procedure is different from that of the third embodiment illustrated in FIG. 16. The procedure according to the fourth embodiment does not include step S300. Outlines of the remaining processes are the same as those of the third embodiment. Hereinafter, the process which is different from that of the third embodiment will be described.

The request obtaining section 110 of the PC 30, which have received a response from each WLRD in step S102, determines based on the contents stored in the setting value 410 received from each WLRD, whether packets are indicated as encrypted in each WLRD. The request obtaining section 110 determines whether packets are indicated as encrypted in each WLRD, and when it is determined that there is WLRD in which any packet is indicated as not encrypted, the request obtaining section 110 displays the confirmation screen WD1 illustrated in FIG. 7 in the display section 33 (step S104).

For example, in the confirmation screen WD1 illustrated in FIG. 7, when the OK button AB1 is pressed while the check box CK is ticked, the request obtaining section 110 determines that the user has selected to perform encryption of packets in all the WLRDs, and continues the process.

The instruction section 120 of the PC 30 overwrites values in the setting value 410 with corresponding values in the preset value 420 received from the respective WLRDs (step S106). Preferably, overwriting of values is performed on only those WLRDs for which packets are determined in step S104 to be indicated as not encrypted.

Thereafter, the instruction section 120 of the PC 30 transmits setting instructions to the WLRDs for which packets are determined in step S104 to be indicated as not encrypted (step S108). The setting instruction can be broadcast to all the WLRDs. The control sections 310 of the WLRDs that have received the setting instructions update the respective setting value tables 410 stored in the flash ROM 400 with the values included in the setting instruction received in step S108 (step S110).

Thereafter, the control sections 310 of the respective WLRDs transmit the update results (success/failure) to the PC 30 (step S112). The instruction section 120 of the PC 30 updates the security setting value 210 stored in the hard disk 200 with the updated encryption keys and the updated encryption methods, with respect to the WLRDs whose update results indicate "success" (step S114).

As described above, according to the fourth embodiment, the same effect as in the first embodiment can be obtained. Further, when the PC 30 of the fourth embodiment receives from the user a selection to perform encryption of packets, the PC 30 transmits setting instructions to the WLRDs for which packets are indicated as not encrypted. Thus, security settings can be performed simply and easily in a wireless communication system including a plurality of WLRDs.

The present invention is not limited to the above embodiments, but may be embodied in various modes without departing from the spirit and scope thereof. For example, the following modifications may be applicable.

The configurations of the wireless communication systems in the above embodiments are merely examples, and any mode can be employed. For example, some components of the wireless communication systems may be removed, or components many be further added to the wireless communication systems. Alternatively, some components in the wireless communication systems may be modified.

For example, in the above embodiments, the security setting process is performed while the WLRD is wiredly connected to the PC. However, the security setting process may be performed while the WLRD is wirelessly connected to the PC.

Further, the functions of the request obtaining section and the instruction section in the above embodiments are realized by executing a client program which is installed from a CD. However, the functions of the request obtaining section and the instruction section may be provided by a WEB system in which a WLRD functions as a server. That is, a PC accesses an address for displaying a setting screen prepared on the WLRD side, by means of a Web browser. Then the browser of the PC displays the setting screen, and through setting by the browser, the functions of the request obtaining section and the instruction section are realized. In this case, to improve the secrecy between the WLRD 20 and the PC 30, a Hypertext Transfer Protocol over Secure Socket Layer (HTTPS) protocol is preferably used. Further, the client program may be provided by means of any suitable storage medium, whether nontransitory, such as a DVD, or the CD in the illustrated embodiment, or transitory, such as by way of a propagation signal.

Further, the configurations of the WLRD described in the above embodiments are merely examples, and any modes of configurations may be employed. For example, some components of the WLRD may be removed, or components may be added to the WLRD. Alternatively, some components of the WLRD may be modified.

In the above embodiments, the WLRD is a wireless LAN relay device which has a multiple SSID function and is configured to operate in a plurality of logical wireless networks. However, the WLRD may be a wireless LAN relay device which is configured to operate in a single logical wireless network. In this case, only a single entry is stored in the tables of the setting value, the preset value, and the security status.

Further, in the above embodiments, the setting value, the preset value, and the security status value are stored in the flash ROM of the WLRD. However, these tables may be stored in a storage medium other than the flash ROM. For example, it may be set such that the WLRD provides a Universal Serial Bus (USB) interface, and the respective tables are stored in a storage medium such as a USB memory, which is detachably mounted to the WLRD.

Further, in the setting value, the preset value, and the security status value, other fields than those described in the above embodiments may be provided. Further, the values stored in the tables described in the above embodiments are merely examples, and any values many be employed.

The encryption/decryption section need not be such a module that is included in the communication section and invoked by the communication section. Instead, the encryption/decryption section may be configured independently from the communication section to perform encryption and decryption. In this case, a combination of the encryption/decryption section and the communication section functions in the same manner as the "communication section" in the above embodiments. In the above embodiments, the wireless LAN relay device is configured to be wirelessly communicable with the PC, i.e., the outer device. However, the wireless LAN relay device may have a function as a wireless router. The wireless LAN relay device having the function as the wireless router may be arranged between the PC and an outside LAN or Wide Area Network (WAN) to enable communication therebetween.

Further, the security setting process described in the above embodiments may be modified arbitrarily without departing from the spirit and scope of the present invention. For example, some steps in the security setting process may be omitted, or some steps may be added to the security setting process. Alternatively, some steps in the security setting process may be modified.

For example, in the above description, the security setting processes according to the third and fourth embodiments (FIGS. 16, 18) are modifications of the security setting process (FIG. 6) according to the first embodiment. However, the security setting process may be set as a modification of the security setting process (FIG. 14) according to the second embodiment.

Further, the confirmation screen described in the above embodiments may be changed arbitrarily without departing from the spirit and scope of the present invention. For example, some screen display items may be removed, or new items may be added as the screen display items. Alternatively, some of the screen display items may be modified.

What is claimed is:

1. A wireless LAN relay device comprising:
a wired communications interface;
a wireless communications interface;
a preset-values storage section storing at least one predetermined encryption key and one predetermined encryption method, for encrypted-packet based communications by the relay device;
an encryption-settings storage section storing at least one current encryption key and one current encryption method, for the encrypted-packet based communications by the relay device; and
a central processing unit (CPU) configured to function as
a communications section for carrying out wired communications with an external communications device via said wired communications interface, and for network-connecting, and carrying out packet-based wireless communications with, wireless-communications enabled external devices via said wireless communications interface, the communications section being configured to operate in an initialized state of the relay device in which the communications section carries out unencrypted-packet based communications with wireless-communications enabled external devices, and to operate in an packet-encrypting state of the relay device in which the communications section carries out encrypted-packet based communications with wireless-communications enabled external devices; and
a control section, responsive to an external communications device connected to the relay device via said wired communications interface, for
transmitting to the external communications device, upon reception of a security-status request from the external communications device, the at least one current encryption key and at least one current encryption method and the at least one predetermined encryption key and one predetermined encryption method, and
upon reception of an updating instruction from the external communications device, for overwriting the at least one current encryption key and at least one current encryption method stored in the encryption-settings storage section either with
the at least one predetermined encryption key and one predetermined encryption method stored in the preset-values storage section, in case the relay device is in the initialized state, or
an external-communications-device provided updated encryption key and an external-communications-devise provided updated encryption method, in case the relay device is in the packet-encrypting state.

2. The wireless LAN relay device according to claim 1, further comprising
a security-status value storage section for storing a security-status value indicating whether the packets of packet-based wireless communications with a wireless-communications enabled external device that the communications section network-connects to are encrypted, wherein upon reception of a security-status request from an external communications device, the control section transmits to the external communications device information including the security-status value stored in the security-status value storage section.

3. A wireless LAN relay device for connecting an external communications device to a network, the wireless LAN relay device comprising:
a communication section configured to operate in a plurality of logical wireless networks, the communication section for controlling wired communication and wireless communication performed between the wireless LAN relay device and the external communications device using packets, the communication section being configured to
perform, in an initial state, communication without encrypting the packets, and
encrypt during communication of the packets, upon reception of a setting instruction from the external communications device, the packets by using a predetermined encryption key and a predetermined encryption method that are preliminarily defined in the wireless LAN relay device;
a setting values storage section for storing, in association with identifiers identifying the plurality of logical wireless networks, a plurality of current encryption keys and a plurality of current encryption methods for use by the communication section to encrypt the packets;
a preset values storage section for storing, in association with the identifiers, a plurality of the predetermined encryption keys and a plurality of the predetermined encryption methods; and
a control section for transmitting, upon reception of a request from the external communications device, the current encryption key and the current encryption method to the external communications device, and overwriting, upon reception of the setting instruction by the communication section from the external communications device, the current encryption key and the current encryption method, stored in the setting values storage section, that are associated with at least one of the identifiers as being included in the setting instruction, with the predetermined encryption key and the predetermined encryption method stored in the preset values storage section.

4. A wireless communication system comprising:
an external communications device; and
at least one wireless LAN relay device for connecting the external communications device to a network;
the at least one wireless LAN relay device comprising:
a wired communications interface;
a wireless communications interface;
a preset-values storage section storing at least one predetermined encryption key and one predetermined encryption method, for encrypted-packet based communications by the relay device;
an encryption-settings storage section storing at least one current encryption key and one current encryption method, for the encrypted-packet based communications by the relay device;
a central processing unit (CPU) configured to function as
a communications section for carrying out wired communications with an external communications device via said wired communications interface, and for network-connecting, and carrying out packet-based wireless communications with, wireless-communications enabled external devices via said wireless communications interface, the communications section being configured to operate in an initialized state of the relay device in which the communications section carries out unencrypted-packet based communications with wireless-communications enabled external devices, and to operate in an packet-encrypting state of the relay device in which the communications section carries out encrypted-packet based communications with wireless-communications enabled external devices; and
a control section, responsive to an external communications device connected to the relay device via said wired communications interface, for
transmitting to the external communications device, upon reception of a security-status request from the external communications device, the at least one current encryption key and at least one current encryption method and the at least one predetermined encryption key and one predetermined encryption method, and
upon reception of an updating instruction from the external communications device, for overwriting the at least one current encryption key and at least one current encryption method stored in the encryption-settings storage section either with the at least one predetermined encryption key and one predetermined encryption method stored in the preset-values storage section, in case the relay device is in the initialized state, or an external-communications-device provided updated encryption key and an external-communications-device provided updated encryption method, in case the relay device is in the packet-encrypting state; and
a security-status value storage section for storing a security-status value indicating whether the packets of packet-based wireless communications with a wireless-communications enabled external device that the communications section network-connects to are encrypted, wherein upon reception of a security-status request from an external communications device, the control section transmits to the external communications device information including the security-status value stored in the security-status value storage section;
the external communications device comprising:
a security-status request obtaining section for transmitting a security-status request to the at least one wireless LAN relay device, for determining, based on information received as a response to the request and containing either encryption settings stored in the at least one wireless LAN relay device's encryption-settings storage section or information including the security-status value stored in the at least one wireless LAN relay device's security-status value storage section, whether the at least one wireless LAN relay device's communications section is operating in the initialized state or the packet-encrypting state, and for receiving from a user a selection to have the at least one wireless LAN relay device operate in the packet-encrypting state if the obtained security-status request indicates that the at least one wireless LAN relay device's communications section is operating in the initialized state; and
an updating instruction section for transmitting the updating instruction to the at least one wireless LAN relay device if the security-status request obtaining section receives the user selection to have the at least one wireless LAN relay device operate in the packet-encrypting state.

5. A wireless communication system comprising:
an external communications device; and
wireless LAN relay devices for connecting the external communications device to a network;
the wireless LAN relay devices each comprising:
   a communication section configured to operate in a plurality of logical wireless networks, the communication section for controlling wired communication and wireless communication performed between the wireless LAN relay device and the external communications device using packets, the communication section being configured to
      perform, in an initial state, communication without encrypting the packets, and
      encrypt during communication of the packets, upon reception of a setting instruction from the external communications device, the packets by using a predetermined encryption key and a predetermined encryption method that are preliminarily defined in the wireless LAN relay device;
   a setting values storage section for storing, in association with identifiers identifying the plurality of logical wireless networks, a plurality of current encryption keys and a plurality of current encryption methods for use by the communication section to encrypt the packets;
   a preset values storage section for storing, in association with the identifiers, a plurality of the predetermined encryption keys and a plurality of the predetermined encryption methods; and
   a control section for transmitting, upon reception of a request from the external communications device, the current encryption key and the current encryption method to the external communications device, and overwriting, upon reception of the setting instruction by the communication section from the external communications device, the current encryption key and the current encryption method, stored in the setting values storage section, that are associated with at least one of the identifiers as being included in the setting instruction, with the predetermined encryption key and the predetermined encryption method stored in the preset values storage section;
the external communications device comprising:
   a security-status request obtaining section for transmitting a security-status request to each of the wireless LAN relay devices, for determining for each of the plurality of logical wireless networks, based on information received as a response to the request and containing either encryption settings stored in the wireless LAN relay device's encryption-settings storage section or information including the security-status value stored in the wireless LAN relay device's security-status value storage section, whether the wireless LAN relay device's communications section is operating in the initialized state or the packet-encrypting state, and for receiving from a user a selection to have the wireless LAN relay device operate in the packet-encrypting state if the obtained security-status request indicates that the at least one wireless LAN relay device's communications section is operating in the initialized state; and
   a setting instruction section for transmitting the setting instructions, as including the identifiers for each of the plurality of logical wireless networks, to each of the wireless LAN relay devices, if the security-status request obtaining section receives the user selection to have the wireless LAN relay device operate in the packet-encrypting state.

6. A method of controlling a wireless LAN relay device for connecting external communications device to a network, the method controlling packet-based wired communications and wireless communications between the wireless LAN relay device and the external communications device, the method comprising steps of:
   causing the wireless LAN relay device to carry out unencrypted wireless communications, in an initialized state of the relay device;
   causing the wireless LAN relay device to carry out encrypted-packet based communications, in a packet-encrypting state of the relay device; and
   transmitting to the external communications device, upon reception of a security-status request from the external communications device, an at least one current encryption key and at least one current encryption method and an at least one predetermined encryption key and one predetermined encryption method, stored in the wireless LAN relay device, and upon reception of an updating instruction from the external communications device, overwriting the at least one current encryption key and at least one current encryption method stored in the wireless LAN relay device, either with the at least one predetermined encryption key and one predetermined encryption method, in case the wireless LAN relay device is in the initialized state, or with an external-communications-device provided updated encryption key and an external-communications-device provided updated encryption method, in case the relay device is in the packet-encrypting state.

* * * * *